(12) United States Patent
Kato (10) Patent No.: US 8,712,662 B2
(45) Date of Patent: Apr. 29, 2014

(54) VEHICLE MOTION CONTROL DEVICE

(75) Inventor: Toshihisa Kato, Handa (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 821 days.

(21) Appl. No.: 12/822,435

(22) Filed: Jun. 24, 2010

(65) Prior Publication Data

US 2010/0332098 A1    Dec. 30, 2010

(30) Foreign Application Priority Data

Jun. 30, 2009  (JP) ................................. 2009-155807

(51) Int. Cl.
| | | |
|---|---|---|
| B60T 8/24 | (2006.01) | |
| B60T 8/1755 | (2006.01) | |
| B60T 8/172 | (2006.01) | |

(52) U.S. Cl.
CPC ............. *B60T 8/24* (2013.01); *B60T 8/1755* (2013.01); *B60T 8/172* (2013.01)
USPC .......................................................... 701/72

(58) Field of Classification Search
CPC .......... B60T 8/24; B60T 8/1755; B60T 8/172
USPC .................................................... 701/72, 80
See application file for complete search history.

(56) References Cited

U.S. PATENT DOCUMENTS

| | | | | |
|---|---|---|---|---|
| 5,863,105 A | * | 1/1999 | Sano | ............................... 303/146 |
| 5,869,943 A | | 2/1999 | Nakashima et al. | |
| 6,065,558 A | * | 5/2000 | Wielenga | ........................ 180/282 |
| 7,337,047 B2 | | 2/2008 | Ueno et al. | |
| 7,392,127 B2 | * | 6/2008 | Kato et al. | ........................ 701/70 |
| 2007/0112498 A1 | | 5/2007 | Yasutake et al. | |
| 2007/0282510 A1 | | 12/2007 | Nimmo et al. | |
| 2008/0208427 A1 | * | 8/2008 | Matsuno et al. | ................. 701/80 |

FOREIGN PATENT DOCUMENTS

| | | | |
|---|---|---|---|
| CH | 116253 | A | 6/1925 |
| DE | 19746889 | A1 | 5/1998 |
| DE | 69837408 | T2 | 11/2007 |
| JP | 10100773 | A | 4/1998 |
| JP | 10329682 | A | 12/1998 |
| JP | 2001058563 | A | 3/2001 |
| JP | 2007131251 | A | 5/2007 |
| JP | 2007513002 | A | 5/2007 |
| JP | 4084248 | B2 | 2/2008 |
| JP | 200951370 | A | 3/2009 |

OTHER PUBLICATIONS

German Official Action dated Feb. 1, 2013 issued in the corresponding German Patent Application No. 102010025364.2 and English translation.
Japanese Official Action dated May 14, 2013 issued in the corresponding Japanese Patent Application No. 2009-155807 and English translation.

* cited by examiner

*Primary Examiner* — Fadey Jabr
*Assistant Examiner* — Yazan A Soofi
(74) *Attorney, Agent, or Firm* — Buchanan Ingersoll & Rooney PC (57) ABSTRACT

The vehicle motion control device performs anti-lateral overturn control for increasing a brake force to be generated at a front inside wheel of a vehicle in order to cause skidding at the front inside wheel when a condition for increasing a brake force to be generated at an outside wheel is satisfied, wherein the condition is that the vehicle motion control device is in the anti-lateral overturn mode and the vehicle is turning.

5 Claims, 8 Drawing Sheets

VEHICLE MOTION CONTROL DEVICE

CROSS REFERENCE TO RELATED APPLICATION

This application is based on and incorporates herein by reference Japanese patent applications No. 2009-155807 filed on Jun. 30, 2009.

FIELD OF THE INVENTION

The present invention relates to a vehicle motion control device for controlling pressures (hereinafter referred to as W/C pressures) to be generated at wheel cylinders (hereinafter referred to as W/C) of a vehicle and accordingly suppressing lateral overturn of the vehicle.

BACKGROUND OF THE INVENTION

In Japanese Patent No. 408-4248, brake control for a vehicle is described which sets a target slip ratio of a front outside wheel to a value higher than a normal value and controls the brake force at the front outside wheel based on the target slip ratio when a vehicle is under an avoidance maneuver operation in emergency, wherein the target slip ratio is higher than that in a spin control which works in high-μ situation in which a friction coefficient (hereinafter referred to as μ) of a surface of a road is high. More specifically, a correction coefficient is set to a higher value in order to correct the target slip ratio to a higher value when an inertia moment corresponding to an acceleration in the lateral direction of the vehicle (hereinafter referred to as a lateral acceleration) becomes larger. When the vehicle brake control under the avoidance maneuver operation starts, in order to suppress change in the W/C pressures and thereby prevents the vehicle from rolling and vibrating, duty cycles of boosting and depressurizing of the W/C pressures are set based on a map in which an increase rate and a decrease rate of the W/C pressures are suppressed compared to normal.

However, even if increase gradient or decrease gradient of the W/C pressure is suppressed by using the map in which the increase rate and the decrease rate of the W/C pressures are suppressed, the lateral overturn cannot be sufficiently prevented for a vehicle having a large tendency to the lateral overturn, such as a vehicle with high loading weight.

SUMMARY OF THE INVENTION

It is therefore an object of the present invention to provide a vehicle motion control device which can prevent the lateral overturn of the vehicle more efficiently.

In an aspect of the present invention, a vehicle motion control device includes a brake force control means which performs anti-lateral overturn control for increasing a brake force to be generated at a front inside wheel of a vehicle in order to cause skidding at the front inside wheel when a condition for increasing a brake force to be generated at an outside wheel is satisfied, wherein the condition is that the vehicle motion control device is in the anti-lateral overturn mode and a turning state determination means determines that the vehicle is turning.

As described above, the vehicle motion control device performs the anti-lateral overturn control as a part of a vehicle motion control. In the anti-lateral overturn control, the vehicle motion control device increases the brake force so that the brake force can cause side slip of the outside wheel and the front inside wheel. Therefore, the vehicle motion control device can cause the front inside wheel to skid as well as the outside wheel. Since the vehicle motion control device actively causes the front inside wheel to skid as well as the outside wheel, it is possible to further suppress rolling of the vehicle and, accordingly, the lateral overturn of the vehicle.

The brake force control means may change the brake force to be generated at the front inside wheel based on at least one of a loading weight, a steering angle, a roll angle, and a friction coefficient of a surface of a road beneath the vehicle.

The brake force at the front inside wheel causing the front inside wheel to start skidding changes depending on the loading weight, the steering angle, the roll angle, and the friction coefficient of the surface of the road beneath the vehicle. Therefore, it is possible to generate a brake force suitable for causing the front inside wheel to skid if the vehicle motion control device changes the brake force to be generated at the front inside wheel based on at least one of the loading weight (or otherwise, a total weight of the vehicle), the steering angle, the roll angle, and the friction coefficient.

The vehicle motion control device may include a skid determination means for determining whether the front inside wheel is skidding. In this case, the brake force control means may increase, in order to cause the front inside wheel to skid, the brake force for the front inside wheel until the skid determination means determines that the front inside wheel is skidding.

The vehicle motion control device can cause the front inside wheel to skid with higher possibility if, as described above, the vehicle motion control device increases the brake force for the front inside wheel until the front inside wheel starts skidding.

The brake force control means may increase the brake force to be generated at the outside wheel and the brake force to be generated at the front inside wheel at the same time when the condition for increasing the brake force to be generated at the outside wheel is satisfied.

Since the vehicle motion control device can cause the brake forces at the front inside wheel and the outside wheel at the same time, the vehicle motion control device can cause forward tilting (i.e. nose dive) at both of the front inside wheel side and the outside wheel side of the body of the vehicle at the same time. Causing the forward tilting only at the front inside wheel side of the vehicle body and making the front inside wheel skid preferentially may cause the vehicle to roll and vibrate. Therefore, the vehicle motion control device in the present embodiment can suppress the rolling and vibration of the vehicle. In addition, since the vehicle motion control device can also cause skidding at the front inside wheel early and with higher possibility, it can further suppress the lateral overturn of the vehicle, as is the case with the first embodiment.

The brake force control means may increase, when the condition for increasing the brake force to be generated at the outside wheel is satisfied, the brake force to be generated at the front inside wheel and subsequently increase, after the front inside wheel starts skidding, the brake force to be generated at the outside wheel.

Thus, the vehicle motion control device first increases the brake force at the front inside wheel and then secondly increases the brake force at the outside wheel. Therefore, the vehicle motion control device gives the brake force to the front inside wheel early and thereby causes forward tilting (i.e. nose dive) at the front inside wheel side of the body of the vehicle early. Accordingly, the front inside wheel is pressed to the surface of the road with larger pressing force (i.e. load) and comes to have a greater tendency to skidding. Consequently, the vehicle motion control device can cause the front inside wheel to skid with higher possibility and accordingly further suppress the lateral overturn of the vehicle.

The vehicle motion control device may further include a prognosis means for making a prognosis in advance that the condition for increasing the brake force to be generated at the outside wheel is going to be satisfied. In this case, the brake force control means may increase, when the condition for increasing the brake force to be generated at the outside wheel is satisfied, the brake force for the front inside wheel to a marginal brake force above which the front inside wheel skids.

With this operation, as soon as the condition for increasing the brake force to be generated at the outside wheel becomes satisfied and the vehicle motion control device increases the brake force at the front inside wheel, the vehicle motion control device can cause the front inside wheel to skid. Therefore, it is possible to cause the front inside wheel to start skidding earlier and thereby further suppress the lateral overturn of the vehicle.

The brake force control means may change the marginal brake force based on at least one of a loading weight, a steering angle, a roll angle, and a friction coefficient of a surface of a road beneath the vehicle.

The marginal brake force changes depending on the loading weight, the steering angle, the roll angle, and the friction coefficient of the surface of the road beneath the vehicle. Therefore, when the vehicle motion control device makes a prognosis in advance that the condition for increasing the brake force to be generated at the outside wheel is going to be satisfied, the vehicle motion control device may determine the brake force to be generate at the front inside wheel so that it changes depending on at least one of the loading weight, the steering angle, the roll angle, and the friction coefficient of the surface of the road. With this operation, it is possible to generate a brake force at the front inside wheel so that the brake force is suitable for causing the front inside wheel to skid.

The vehicle motion control device may further include a loading weight determination means for determining whether a loading weight of the vehicle is larger than a predetermined threshold. In this case, the brake force control means may increase the brake force for the front inside wheel only when the loading weight determination means determines that the loading weight is larger than the predetermined threshold.

The vehicle motion control device may cause the front inside wheel to skid even when the loading weight is smaller than the threshold. However, causing the front inside wheel to skid is fundamentally identical with putting the vehicle into the understeer state. Therefore, in view of steerability, it is preferable that brake vehicle motion control device causes the front inside wheel to skid only when the lateral overturn of the vehicle is highly possible. Thus, the vehicle motion control device can prevent the vehicle from needlessly getting into the understeer state and also suppress reduction of the steerability.

BRIEF DESCRIPTION OF THE DRAWINGS

The invention, together with additional objective, features and advantages thereof, will be best understood from the following description, the appended claims and the accompanying drawings. In the drawings:

DETAILED DESCRIPTION OF THE EMBODIMENTS

Hereinafter, preferred embodiments of the present invention will be described in detail with reference to the appended drawings. Note that elements that are the same or equivalent to each other in the following embodiments are denoted with the same reference numerals in the appended drawings.

First Embodiment

Figure 1:
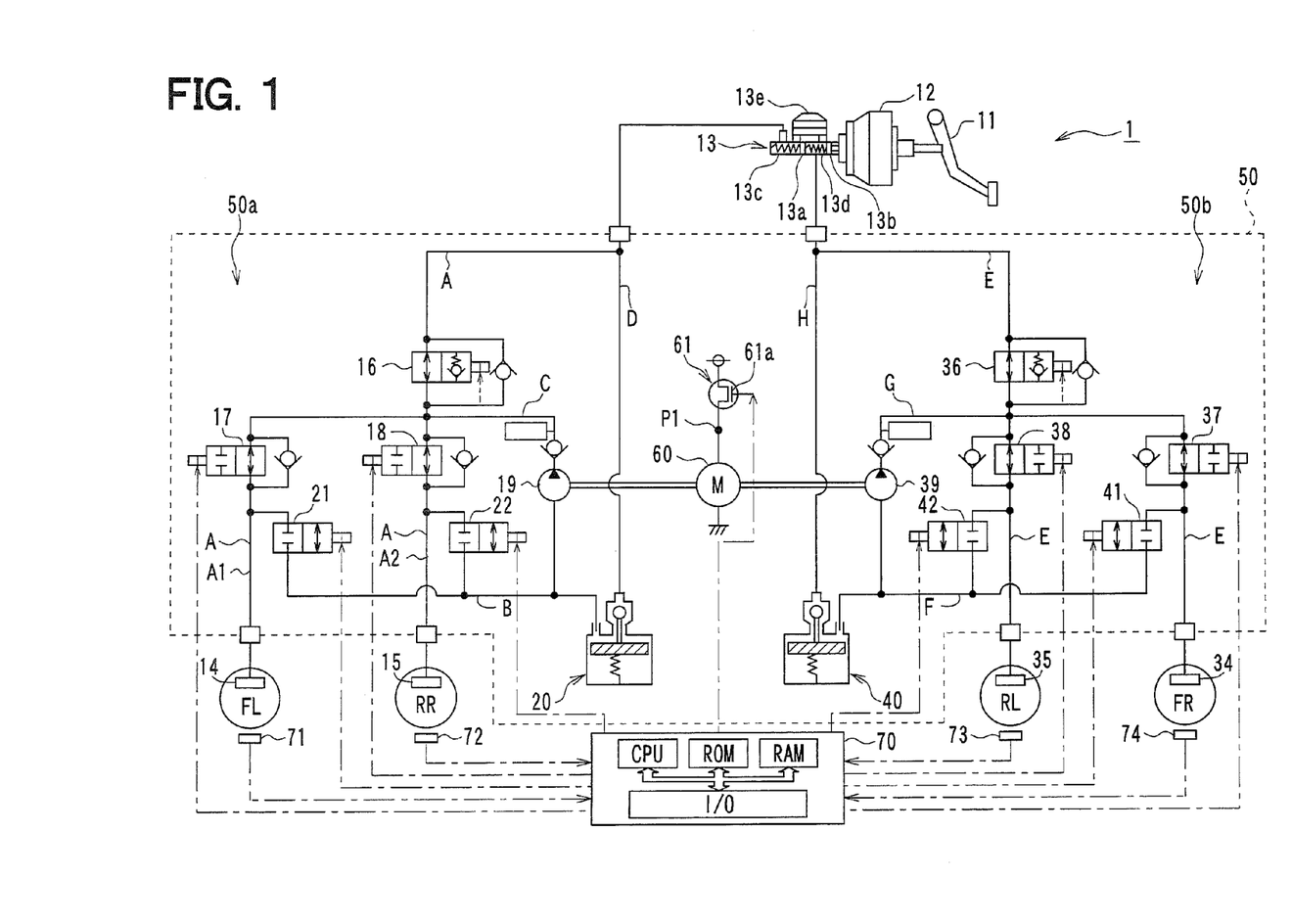
FIG. 1 is a diagram showing overall structure of a brake control system performing vehicle motion control in a first embodiment of the present invention.

A first embodiment of the present invention will now be described. FIG. 1 is a diagram showing the overall structure of a brake control system 1 for a vehicle that realizes a vehicle motion control according to a first embodiment of the present invention. In the first embodiment, a case will be described in which an anti-lateral overturn control is performed as the vehicle motion control.

With reference to FIG. 1, when a driver depresses a brake pedal 11, the depression force is boosted by a servo unit 12, and pushes master pistons 13a, 13b located in a master cylinder 13. As a result, a same master cylinder pressure is generated in a primary chamber 13c and a secondary chamber 13d defined by the master pistons 13a, 13b. The master cylinder pressure is transmitted to respective wheel cylinders 14, 15, 34, and 35 through an actuator 50 for controlling brake fluid pressure.

The master cylinder 13 is provided with a master reservoir 13e having a passage that is in communication with the primary chamber 13c and the secondary chamber 13d.

The actuator 50 includes a first conduit system 50a and a second conduit system 50b. The first conduit system 50a controls brake fluid pressures applied to a left front wheel FL and a right rear wheel RR, and the second conduit system 50b controls brake fluid pressures applied to a right front wheel FR and a left rear wheel RL.

The first conduit system 50a and the second conduit system 50b have a similar structure. Accordingly, in the following description, only the first conduit system 50a will be explained and explanation of the second conduit system 50b will be omitted.

The first conduit system 50a includes a conduit A serving as a main conduit. The conduit A transmits the aforementioned master cylinder pressure to the wheel cylinder 14 provided at the left front wheel FL and the wheel cylinder 15 provided at the right rear wheel RR and thereby generates wheel cylinder pressures.

The conduit A includes a first differential pressure control valve 16 that can be controlled to a communicated state and a differential pressure state. The valve position of the first differential pressure control valve 16 is adjusted such that the first differential pressure control valve 16 is in the communicated state during a normal braking operation. In the normal braking operation, the driver depresses the brake pedal 11 and the vehicle motion control is not being performed. When an electric current is applied to a solenoid coil provided in the first differential pressure control valve 16, the valve position is adjusted such that the pressure difference becomes larger as the value of the electric current is increased.

When the first differential pressure control valve 16 is in the differential pressure state, the brake fluid is allowed to flow from the wheel cylinders 14, 15 side to the master cylinder 13 side only when the brake fluid pressure on the wheel cylinders 14, 15 side is higher than the master cylinder pressure by a determined pressure or more. Therefore, the brake fluid pressure on the wheel cylinders 14, 15 side is normally maintained not to become higher than the pressure on the master cylinder 13 side by the determined pressure or more.

The conduit A branches into two conduits A1 and A2 at the wheel cylinders 14, 15 side of the first differential pressure control valve 16 (i.e. downstream of the first differential pressure control valve 16). A first boost control valve 17 is provided in the conduit A1, and controls the increase in the brake fluid pressure to the wheel cylinder 14. A second boost control valve 18 is provided in the conduit A2, and controls the increase in the brake fluid pressure to the wheel cylinder 15.

The first and the second boost control valves 17, 18 are formed by a two-position electromagnetic valve that can be controlled to a communicated state and a closed state.

The first and the second boost control valves 17, 18 are normally open valves. More specifically, when a control current applied to solenoid coils provided in the first and the second boost control valves 17, 18 is zero (i.e. when no current is applied), the first and the second boost control valves 17, 18 are controlled to the communicated state. In addition, when the control current is applied to the solenoid valves, the first and the second boost control valves 17, 18 are controlled to the closed state.

A conduit B serving as a pressure reducing conduit connects a place in the conduit A between the first boost control valve 17 and the wheel cylinder 14 with a pressure adjusting reservoir 20, and connects a place of the conduit A between the second boost control valves 18 and the wheel cylinder 15 with the pressure adjusting reservoir 20. The conduit B is provided with a first pressure reducing control valve 21 and a second pressure reducing control valve 22 each formed by a two-position electromagnetic valve that can be controlled to a communicated state and a closed state. The first and the second pressure reducing control valves 21, 22 are normally closed valves.

Further, a conduit C serving as a reflux conduit is provided between the pressure adjusting reservoir 20 and the conduit A serving as the main conduit. The conduit C is provided with a self-priming pump 19 that is driven by a motor 60. The self-priming pump 19 sucks up brake fluid from the pressure adjusting reservoir 20 and discharges it to the master cylinder 13 side or the wheel cylinders 14, 15 side. Supply voltage to the motor 60 is controlled according to ON and OFF of a semiconductor switch 61a included in a motor relay 61.

Furthermore, a conduit D serving as an auxiliary conduit is provided between the pressure adjusting reservoir 20 and the master cylinder 13. The brake fluid is sucked from the master cylinder 13 through the conduit D by the pump 19 and is discharged to the conduit A. As a result, the brake fluid is supplied to the wheel cylinders 14, 15 side during a vehicle motion control such as an anti-lateral overturn control, a traction control (TCS) or the like, thereby increasing the wheel cylinder pressure of a target wheel.

Figure 2:
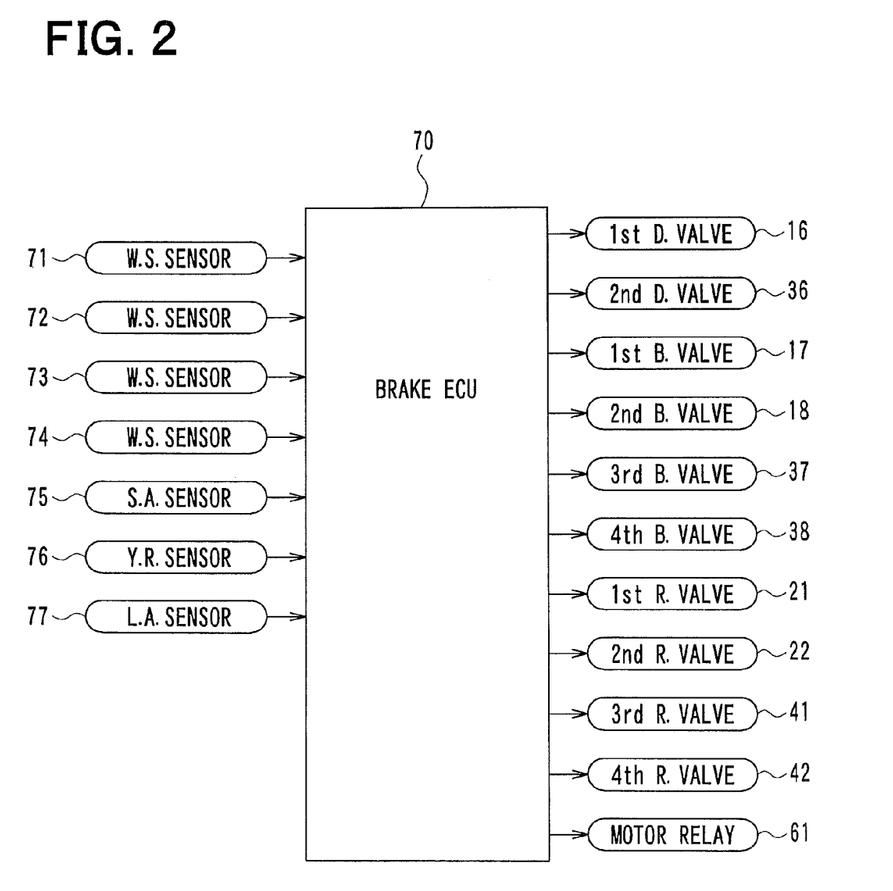
FIG. 2 is a block diagram showing input and output structure of a brake ECU.

A brake ECU 70, which corresponds to a vehicle motion control device of the present invention, controls a control section of the brake control system 1. The brake ECU 70 is a known microcomputer provided with a central processing unit (CPU), a read only memory (ROM), a random access memory (RAM), an input/output (I/O) port, and the like. The brake ECU 70 performs processing, such as various types of calculation, according to programs stored in the ROM and the like. FIG. 2 is a block diagram showing the relationship between the input and the output of a signal of the brake ECU 70.

As shown in FIG. 2, the brake ECU 70 receives detection signals from wheel speed sensors 71 to 74 provided at respective wheels FL to RR, a steering angle (wheel heading angle) sensor 75, a yaw rate sensor 76, and a lateral acceleration sensor 77, and performs calculations of various types of physical quantities. For example, the brake ECU 70 calculates, based on the detection signals, the wheel speeds of the wheels FL to RR, a speed of the vehicle (i.e. an estimated speed of the body of the vehicle), slip ratios of the wheels, a steering angle, a yaw rate, and a lateral acceleration. Based on the calculated physical quantities, the brake ECU 70 determines whether to execute the anti-lateral overturn control, selects a control target wheel to be under control of the anti-lateral overturn control, and calculates a control amount, that is, a W/C (wheel cylinder) pressure to be generated at the wheel cylinder corresponding to the control target wheel. Based on the above operation, the brake ECU 70 executes control for supplying electric currents to the control valves 16 to 18, 21, 22, 36 to 38, 41 and 42 and also controls amounts of the electric currents supplied to motor 60 for driving the pumps 19 and 39.

For example, in the case that the brake ECU 70 selects the left front wheel FL as the control target wheel and generates the W/C pressure at the wheel, the brake ECU 70 controls the first differential pressure control valve 16 to the differential pressure state, turns the motor relay 61 to ON, and drives the pump 19 by means of the motor 60. Then, the brake fluid pressure downstream (i.e. W/Cs 14, 15 side) of the first differential pressure control valve 16 increases because of the differential pressure generated at the first differential pressure control valve 16. At this time, the second boost control valve 18 corresponding to the right rear wheel RR as a non-control target wheel is closed so that the wheel cylinder 15 is not pressurized. In this state, in order to generate a desired W/C pressure at the W/C 14, the brake ECU 70 controls the first boost control valve 17 and a first pressure reducing control valve 21 which correspond to the left front wheel FL as the control target wheel.

More specifically, the brake ECU 70 properly switches between a depressurization mode, a pressure maintain mode and a pressure boosting mode to adjust the W/C pressures. In the depressurization mode, the first boost control valve 17 is controlled to the closed state and the first pressure reducing control valve 21 is switched between the communicated state and the closed state in a manner of duty control so that the W/C pressure is decreased. In the pressure maintain mode, the first boost control valve 17 and the first pressure reducing control valve 21 are controlled to the closed state so that the W/C pressure is maintained. In the pressure boosting mode, the first pressure reducing control valve 21 is controlled to the closed state and the first boost control valve 17 is switched between the communicated state and the closed state in a manner of duty control so that the W/C pressure is increased.

Thus, the W/C pressure and the brake force is controlled so that a desired target W/C pressure Pto is achieved.

It should be noted that the motor 60 drives the pump 39 as well as the pump 19. However, if the second differential pressure control valve 36 is not controlled to the differential pressure state, brake fluid is only circulated and the W/Cs 34, 35 are not pressurized.

The brake control system 1 of the present embodiment is constructed as above. Next, the specific operation of the brake control system 1 will be described. Note that the brake control system 1 can perform an anti-side slip (ABS) control and the like as a vehicle motion control, in addition to a normal brake control. The basic operations of these controls are the same as those of the related arts, so only the operation relating to the anti-lateral overturn control, which relates to a key feature of the present invention, will be described.

Figure 3:
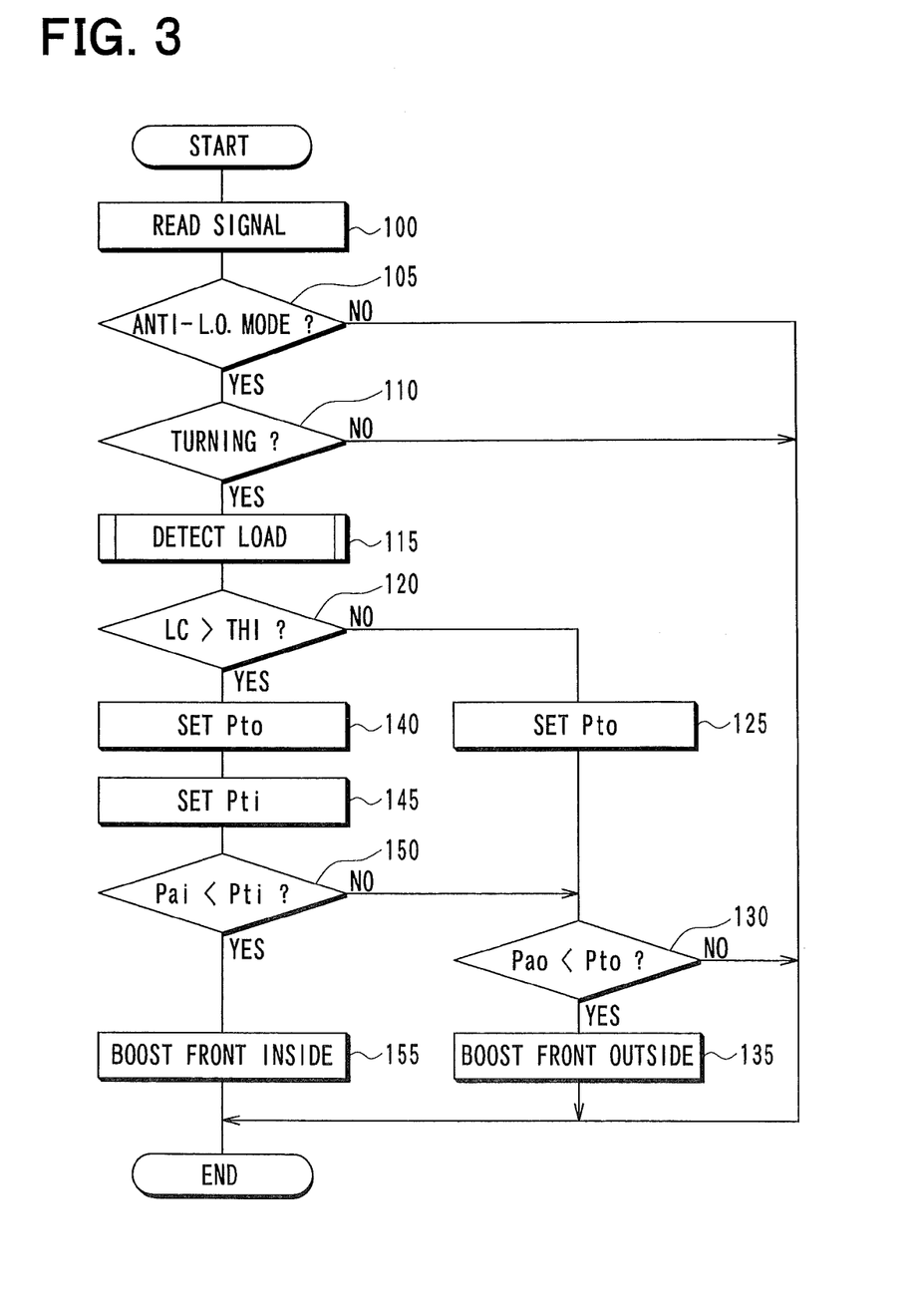
FIG. 3 is a flowchart showing an anti-lateral overturn control which the brake ECU performs according to a program.

FIG. 3 is a flowchart of an anti-lateral overturn control process, which is performed by the brake ECU 70. The anti-lateral overturn control process is performed repeatedly once per a predetermined calculation period after an ignition switch (not shown in the drawings) provided in the vehicle is turned on, or otherwise, while the vehicle is running.

First, at step 100, the brake ECU 70 reads several types of sensor signals. More specifically, the brake ECU 70 reads detection signals from the wheel speed sensors 71 to 74, the steering angle sensor 75, the yaw rate sensor 76, the lateral acceleration sensor 77, and the like which are necessary for anti-lateral overturn control and then calculates several physical quantities. With this operation, the wheel speeds of the wheels FL to RR, the steering angle Sa, the yaw rate Yr, and the lateral acceleration Gy are calculated, and the vehicle speed (the estimated speed of the body of the vehicle) is calculated by means of a well-known method. In addition, the actual slip ratios Sa of the wheels FL to RR are calculated each of which is expressed by means of deviation (i.e. (vehicle speed−wheel speed)/vehicle speed) of the vehicle speed from a wheel speed. The steering angle Sa, the yaw rate Yr and the lateral acceleration Gy sometimes become positive and sometimes become negative depending on, for example, whether they indicate left or right. The direction (left or right) corresponding to positive values can be determined arbitrarily.

Then at step 105, the brake ECU 70 determines whether to be in the anti-lateral overturn mode. More specifically, the brake ECU 70 determines whether the lateral acceleration Gy detected at step 100 is equal to or larger than a threshold THg, wherein the threshold THg is a reference value for determining whether the anti-lateral overturn control should be performed. If the determination at step 105 is affirmative, the brake ECU 70 enters or remains in the anti-lateral overturn mode and proceeds to step 110. More specifically, the brake ECU 70 enters the anti-lateral overturn mode if it is not in the anti-lateral overturn mode, and remains in the anti-lateral overturn mode if it is already in the anti-lateral overturn mode. If the determination at step 105 is negative, the brake ECU 70 enters or remains in a normal mode and ends the anti-lateral overturn control process, wherein the normal mode is a mode in which the anti-lateral overturn control is not necessary.

At step 110, the brake ECU 70 determines at step 110 whether the vehicle is turning. For example, the brake ECU 70 determines the vehicle is turning when the absolute value of the steering angle Sa detected at step 100 is larger than a threshold THs indicating turning state. The brake ECU 70 may determine whether the vehicle is turning based on whether the absolute value of the yaw rate Yr is larger than a threshold THy indicating turning state, or based on whether the absolute value of the lateral acceleration Gy is larger than a threshold THg2 indicating turning state. If the determination at step 110 is affirmative, the brake ECU 70 proceeds to step 115. If the determination at step 110 is negative, the brake ECU 70 ends the anti-lateral overturn control process because there is no need for the anti-lateral overturn control.

At step 115, the brake ECU 70 performs a vehicle load detection process. Before describing details of the load detection process, a description is given of fundamentals of vehicle load detection.

First, the behavior of the vehicle in turning motion is studied. When a driver performs steering operation by means of the steering handle, the steering angle is accordingly adjusted through a rack and pinion, wherein the steering angle is a tire angle of a steeling wheel relative to the longitudinal direction of the vehicle. The adjustment of the tire angle results in the yaw and the yaw rate of the vehicle. In other words, the behavior of the vehicle proceeds with steering operation, adjustment of the steering angle, generation of the yaw rate in this order.

In the process from the steering angle to the yaw rate, the yaw rate is generated directly after the adjustment of the steering angle if the steering operation is performed gently. In contrast, the yaw rate is generated belatedly after the adjustment of the steering angle if the steering operation is performed quickly. Therefore, there is relation between steering speed indicating speed of the steering operation and a time lag between the adjustment of the steering angle and the generation of the yaw rate. The time lag is expressed by a phase difference between the steering angle and the yaw rate. Therefore, the relation between the steering speed and the phase difference can be determined as a map or a function expression.

In addition, under the same steering speed and the same road surface condition, phase lags in the behavior of the vehicle becomes larger as the total weight of the vehicle becomes larger. Since the total weight of the vehicle is the sum of the empty vehicle weight of the vehicle which is constant and the loading weight of the vehicle which varies depending on situations, the phase lags in the vehicle behavior depends on the loading weight of the vehicle. Here, the loading weight of the vehicle is a weight of the cargos loaded in the vehicle, and the empty vehicle weight is a weight of the vehicle when no cargo is loaded in the vehicle. Therefore, the phase difference between the steering angle and the yaw rate varies in accordance with the loading weight of the vehicle in the manner that the phase difference between the steering angle and the yaw rate becomes larger as the loading weight becomes larger. Hereinafter, the phase difference between the steering angle and the yaw rate is also referred to as the S-Y phase difference. Therefore, by obtaining a relation between the steering speed and the S-Y phase difference for each of several loading weight of the vehicle through experiments or the like, it becomes possible to estimate the loading weight of the vehicle based on the behavior of the vehicle in turning motion, more specifically, based on the obtained relations, the steering speed, and the phase difference between the steering angle Sa and the yaw rate Yr, wherein the steering speed and the S-Y phase difference can be calculated from the detection signals of the steering angel sensor 75 and the yaw rate sensor 76.

Figure 4A:
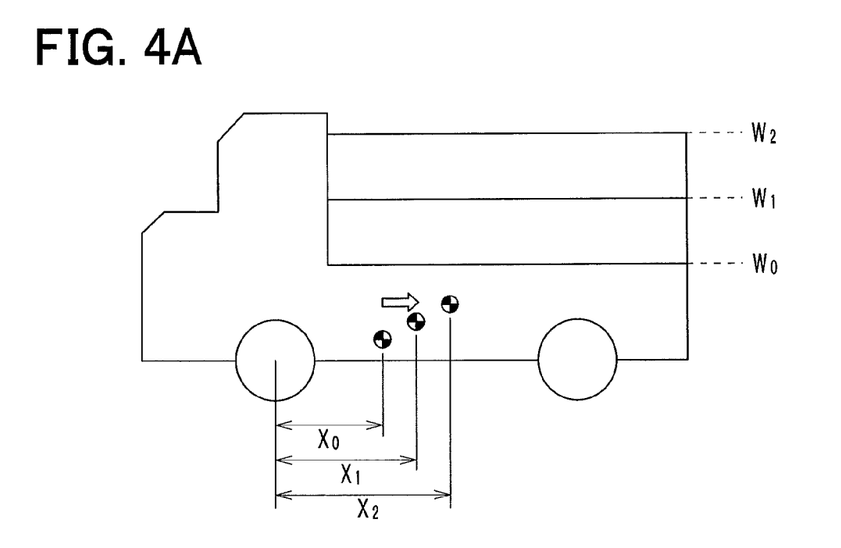
FIG. 4A is a schematic view showing a relation between loading weight W and a position of a gravity center of a vehicle in the case that the vehicle is a truck.
Figure 4B:
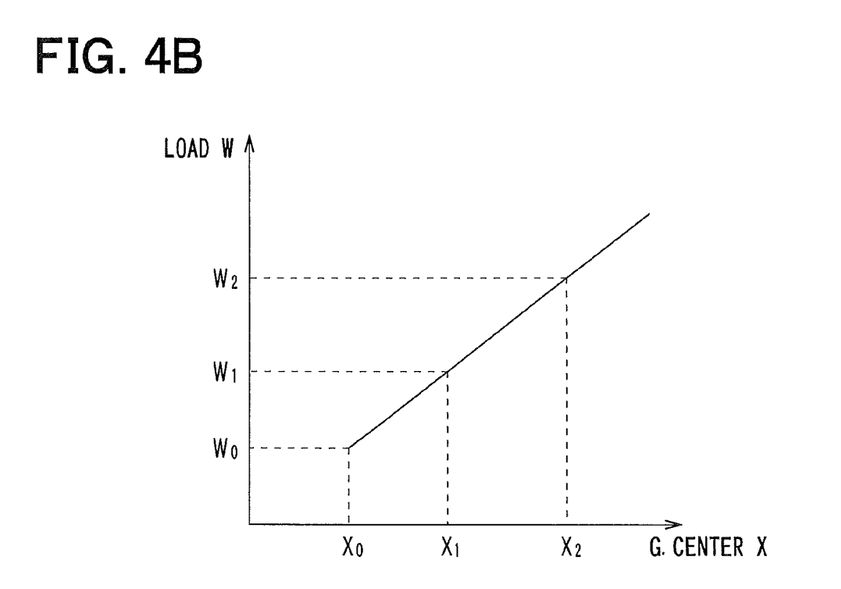
FIG. 4B is a graph showing a relation between the loading weight W and the longitudinal position X of the gravity center of the vehicle in the case of FIG. 4A.

Next, the gravity center of the vehicle is studied. FIGS. 4A and 4B show relations between the loading weight W and the gravity center of the vehicle. More specifically, FIG. 4A is a schematic view showing a relation between the loading weight W and the position of the gravity center of the vehicle in the case that the vehicle is a truck. FIG. 4B is a graph showing a relation between the loading weight W and the longitudinal position X of the gravity center of the vehicle in the case of FIG. 4A.

As shown in FIG. 4A, the gravity center of the vehicle moves toward the rear end of the vehicle as the amount of the load becomes larger since a new cargo is loaded in the loading platform located behind the passenger compartment and is put at an upper position than another cargo previously loaded in the loading platform. Therefore, giving that the gravity center of the empty vehicle with no load is at a position X0, the gravity center moves to a position X1 closer to the rear end of the vehicle than the position X0 when a load of weight W1 is loaded in the vehicle. When a load of weight W2 which is larger than the weigh W1 is loaded in the vehicle, the gravity center moves to a position X2 closer to the rear end of the vehicle than the position X1. Therefore, as shown in FIG. 4B, the longitudinal position of the gravity center X of the vehicle is related with the loading weight W of the vehicle in the manner that the longitudinal position of the gravity center X moves further toward the rear end of the vehicle as the loading weight W becomes larger. This relation makes it possible to estimate the loading weight W of the vehicle if the gravity center X of the vehicle is detected.

The gravity center X can be detected by using load sensors located to suspensions of the vehicle. Besides, the gravity center X can be detected based on a relation between the yaw rate and the lateral acceleration of the vehicle. It is because that displacement of the gravity center does not cause notable change in the yaw moment generated at the vehicle and the displacement of the gravity center X accordingly does not change the yaw rate of the vehicle. However, the lateral acceleration of the vehicle is affected by the displacement of the gravity center X. Since the lateral acceleration sensor is typically located at a vicinity of the gravity center X0 of the empty vehicle with no load, the lateral acceleration sensor is not affected by yaw moment. Therefore, the detection signal from the lateral acceleration sensor does not have yaw component representing the amount of yaw if no cargo is loaded in the vehicle. However, when the gravity center X is displaced from the position X0, the lateral acceleration sensor gets apart from the displaced gravity center X. Therefore, the lateral acceleration sensor is affected by the yaw moment and the yaw component is included in the detection signal from the lateral acceleration sensor.

Therefore, a yaw angular acceleration has a relation with a phase difference (hereinafter also referred to as Y-L phase difference) between the yaw rate and the lateral acceleration. More specifically, the relation between the yaw angular acceleration and the Y-L phase difference changes in accordance with the displacement of the gravity center X, in other words, in accordance with the change of the loading weight W. Therefore, by obtaining a relation between the yaw angular acceleration and the Y-L phase difference for each of several loading weight of the vehicle through experiments or the like, it becomes possible to estimate the loading weight W of the vehicle based on the center of the gravity X, in other words, based on the obtained relation, the yaw rate Yr, the yaw angular acceleration obtained from a differential value of the yaw rate Yr, and the lateral acceleration Gy, which are obtained from the detection signals from the yaw rate sensor 76 and the lateral acceleration sensor 77.

Figure 5:
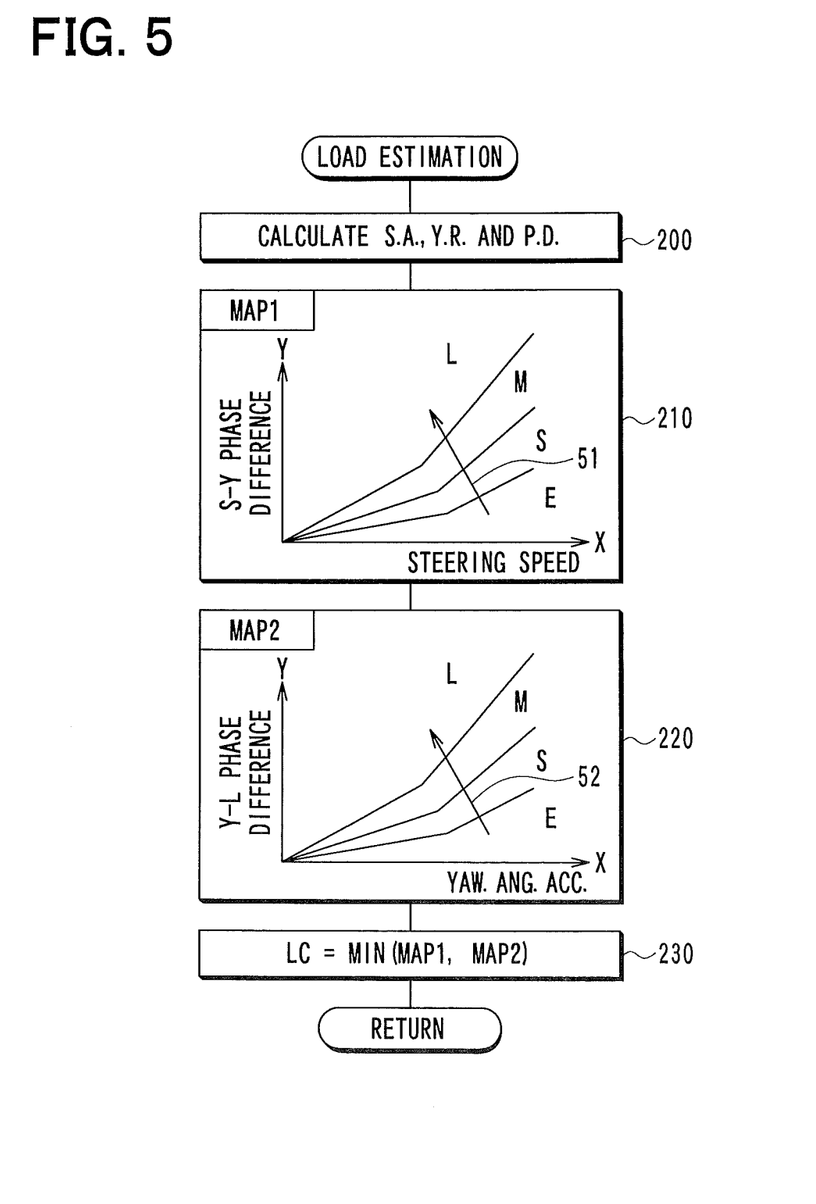
FIG. 5 is a flowchart showing a vehicle load detection process.

The brake ECU 70 performs the vehicle load detection process in a manner based on the above knowledge. FIG. 5 is a flowchart showing the vehicle load detection process which the brake ECU 70 executes based on a program stored in the ROM or the like. Hereinafter, detailed description is given of the vehicle load detection process with reference to the drawing.

The brake ECU 70 executes the vehicle load detection process shown in FIG. 5 once per a predetermined calculation period when the ignition switch is turned from OFF to ON, or otherwise, when the vehicle keeps standing still for a predetermined time, in other words, when there is a possibility of change in the loading weight of the vehicle.

First, at step 200, the brake ECU 70 calculates the steering speed and yaw angular acceleration based on the steering angle Sa and the yaw rate Yr which are calculated at step 100. More specifically, the brake ECU 70 calculates, by calculating the time derivative of the steering angle Sa, the steering speed which is expressed with a differential value of the steering angle Sa. In addition, the brake ECU 70 calculates, by calculating the time derivative of the yaw rate Yr, the yaw angular acceleration which is expressed with a differential value of the yaw rate Yr. Moreover, the brake ECU 70 calculates the S-Y phase difference between the steering angle Sa and the yaw rate Yr and the Y-L phase difference between the yaw rate Yr and the lateral acceleration Gy. The S-Y phase difference between the steering angle Sa and the yaw rate Yr can be calculated, for example, in the following manner. First, the brake ECU 70 compares the detected waveform of the steering angle Sa with the detected waveform of the yaw rate Yr. More specifically, the brake ECU 70 compares the peak point of the former detected waveform with the peak point of the latter detected waveform. A peak point of a waveform is a point in the waveform at which the value of the waveform becomes local maximum. Then, the S-Y phase difference between the steering angle Sa and the yaw rate Yr is obtained by calculating the delay time between the two waveforms (for example, the two peak points.) Similarly, the Y-L phase difference between the yaw rate Yr and the lateral acceleration Gy can be calculated, for example, in the following manner. First; the brake ECU 70 compares the detected waveform of the yaw rate Yr with the detected waveform of the lateral acceleration Gy. More specifically, the brake ECU 70 compares the peak point of the former detected waveform with the peak point of the latter detected waveform. Then, the Y-L phase difference between the yaw rate Yr and the lateral acceleration Gy is obtained by calculating the delay time between the two waveforms (for example, the two peak points.)

Subsequently, the brake ECU 70 proceeds to step 210 and estimates the loading weight, of the vehicle based on the behavior of the vehicle in turning motion. More specifically, the brake ECU 70 estimates the loading weight based on the steering speed and the S-Y phase difference between the steering angle Sa and the yaw rate Yr calculated at steps 100 and 200 and also based on the relations between the steering speed and the S-Y phase difference, wherein the relations are obtained through experiments or the like and stored. As shown in FIG. 5, a map (i.e. MAP1) showing the relations between the steering speed and the S-Y phase difference is obtained through experiments and the like and stored. In this MAP1, the steering angle is on the X-axis and the S-Y phase difference is on the Y-axis. Therefore, the brake ECU 70 estimates the loading weight of the vehicle by determining a corresponding point (X, Y) in this MAP1 corresponding to the pair of the steering speed and the S-Y phase difference calculated at steps 100 and 200.

More specifically, as shown in FIG. 5, the MAP1 is divided by three lines into four areas with four different loading weight ranges, namely, empty (E), small (S), middle (M), and large (L), wherein each of the three lines shows a relation between the steering speed and the S-Y phase difference for one of several loading weight. Therefore, the brake ECU 70 determines one of the four loading weight ranges by determining the corresponding point (X, Y) in the MAP1 corresponding to the pair of the steering speed and the S-Y phase difference calculated at step 100 and 200. The determined loading weight range is stored as the loading weight for the MAP1. An arrow 51 in the MAP1 indicates a direction in which the loading weight increases.

Although only three lines are shown in the MAP1 in FIG. 5, more lines can be used to divide the MAP1 to estimate the loading weight more precisely. A function showing a relation between the steering speed, the S-Y phase difference, and the loading weight can also be used in a manner that the brake ECU 70 substitutes the steering speed and the S-Y phase difference calculated at steps 100 and 200 into this function and then determines whether there is no loading weight, the loading weight is small, the loading weight is middle, or the loading weight is large, or determine the precise loading weight.

Subsequently, the brake ECU 70 proceeds to step 220 and estimates the loading weight based on the position of the gravity center of the vehicle. More specifically, the brake ECU 70 estimates the loading weight based on the yaw angular acceleration and the Y-L phase difference between the yaw rate Yr and the lateral acceleration Gy calculated at steps 100 and 200 and also based on the relations between the yaw angular acceleration and the Y-L phase difference, wherein the relations are obtained through experiments or the like and stored. As shown in FIG. 5, a map showing the relations between the yaw angular acceleration and the Y-L phase difference for several loading weights of the vehicle is obtained through experiments and the like. As is already described, since this map is a map including characteristics for each of the several loading weight of the vehicle, this map is stored as a MAP2 which indicates the relations between the yaw angular acceleration and the Y-L phase difference for each of several loading weights of the vehicle. In this MAP2, the yaw angular acceleration is on the X-axis and the Y-L phase difference is on the Y-axis. Therefore, the brake ECU 70 estimates the loading weight of the vehicle by determining a corresponding point (X, Y) in this MAP2 which is divided into a plurality of ranges of the loading weight, wherein the corresponding point corresponds to the pair of the yaw angular acceleration and the Y-L phase difference calculated at steps 100 and 200.

More specifically, as shown in FIG. 5, the MAP2 is divided by three lines into four areas with four different loading weight ranges, namely, empty (E), small (S), middle (M), and large (L), wherein each of the three lines shows a relation between the yaw angular acceleration and the Y-L phase difference for one of several loading weight. Therefore, the brake ECU 70 determines one of the four loading weight ranges by determining the corresponding point (X, Y) in the MAP2 corresponding to the pair of the yaw angular acceleration and the Y-L phase difference calculated at steps 100 and 200. The determined loading weight range is stored as the loading weight for the MAP2. An arrow 52 in the MAP 2 indicates a direction in which the loading weight increases.

Although only three lines are shown in the MAP2 in FIG. 5, more lines can be used to divide the MAP2 to estimate the loading weight more precisely. A function showing a relation between the yaw angular acceleration, the Y-L phase difference, and the loading weight can also be used in a manner that the brake ECU 70 substitutes the yaw angular acceleration and the Y-L phase difference calculated at steps 100 and 200 into this function and then determines whether there is no loading weight, the loading weight is small, the loading weight is middle, or the loading weight is large, or determine the precise loading weight.

Then the brake ECU 70 proceeds to step 230 to compare the loading weight range for the MAP1 stored at step 210 and the loading weight for the MAP2 stored at step 220 and select the smaller loading weight as a final loading weight LC of the vehicle (LC=min(MAP1, MAP2).) The brake ECU 70 may determine the final loading weight LC based on the loading weights for the MAP1 and MAP2 by another method. For example, the brake ECU 70 may calculate the average or larger one of the loading weights for the MAP1 and MAP2 other than the smaller one as the final loading weight LC. However, the final loading weight LC is updated each time the loading weight is detected and finally becomes a value approximately equal to the weight of the load which is really loaded in the vehicle. Therefore, by selecting not the larger one but the smaller one of the loading weights for the MAP1 and MAP2 from the beginning, it is possible to suppress a possibility that a noise or the like causes the final loading weight LC to increases drastically.

Thus, the brake ECU 70 detects the loading weight based on the behavior of the vehicle in the turning motion. More specifically, the brake ECU 70 detects the loading weight based on the predetermined relations between the steering speed and the S-Y phase difference and also based on the steering speed and the S-Y phase difference which are calculated based on the detection signals from the sensors 75 to 77. Even if some kind of external disturbance such as braking torque, slip on the four wheels, vibration of the vehicle, and rapid change in characteristics of a road in a very short time occurs, the loading weight of the vehicle is calculated accurately because both of the steering speed and the S-Y phase difference which are calculated based on the detection signals from the sensors 75 to 77 are affected by the external disturbance.

The vehicle weight detection device according to the present embodiment detects the loading weight of the vehicle based on the position of the gravity center of the vehicle. More specifically, the brake ECU 70 detects the loading weight based on the predetermined relations between the yaw angular acceleration and Y-L phase difference and also based on the yaw angular acceleration and the Y-L phase difference which are calculated based on the detection signals from the sensors 75 to 77. Even if some kind of external disturbance such as braking torque, slip on the four wheels, vibration of the vehicle, and rapid change in characteristics of a road in a very short time occurs, the loading weight of the vehicle is calculated accurately because both of the yaw angular acceleration and the Y-L phase difference which are calculated based on the detection signals from the sensors 75 to 77 are affected by the external disturbance.

Moreover in the present embodiment, the loading weight is detected based on the behavior of the vehicle in turning motion in one aspect and based on the position of the gravity center of the vehicle in another aspect. Therefore, it is possible to detect the loading weight more accurately.

When the load detection process ends, the brake ECU 70 proceeds to step 120 and determines whether the loading weight LC determined at step 115 is larger than a threshold THl at which lateral overturn is supposed to happen easily. If the determination at step 120 becomes negative, the brake ECU 70 proceeds to step 125 and determines a target W/C pressure Pto for a front outside wheel. The front outside wheel is one of front wheels of the vehicle and located at the outside of the vehicle when the vehicle is turning right or left. In addition, the front outside wheel is one of wheels to be controlled. The brake ECU 70 detects the turning direction (left or right) of the vehicle based on the steering angle Sa and selects a front wheel at the counter side of the turning direction as the front outside wheel. The target W/C pressure Pto is determined so that it intentionally causes the front outside wheel to slip and makes the vehicle accordingly skid in order to cause understeer tendency and accordingly suppress lateral overturn. At this time, the target W/C pressure Pto may be set to a constant value. However, a W/C pressure necessary for causing the vehicle to skid varies depending on the state or the like of the vehicle.

Therefore, In the present embodiment, the brake ECU 70 determines the target W/C pressure Pto. based on the loading weight LC detected at step 115 or based on the total vehicle weight which is equal to the sum of the empty vehicle weight and the detected loading weight LC. Since it becomes easier to cause the vehicle slip as the loading weight LC becomes larger, the target W/C pressure Pto is set so that it becomes smaller as the loading weight LC becomes larger as long as it can make the vehicle slip.

In addition, the target W/C pressure Pto can be determined based on the steering angle Sa, a roll angle of the vehicle, a state of the surface of the road beneath the vehicle as well as the loading weight LC. Since it becomes easier to make the vehicle slip as the steering angle Sa or the roll angle becomes larger, the target W/C pressure Pto can be set so that it becomes smaller as the steering angle Sa and/or the roll angle becomes larger as long as it can make the vehicle slip. Since it becomes easier to make the vehicle slip as the surface of the road becomes rougher, the target W/C pressure Pto can be set so that it becomes smaller as the friction coefficient µ of the surface of the road becomes smaller as long as it can make the vehicle slip.

The roll angle can be detected by a roll angle sensor which can be located in the vehicle. The friction coefficient µ can be calculated based on the steering angle, the speed of the vehicle, the yaw rate, and the like. Since many methods for calculating the friction coefficient µ is well-known, details of calculating the friction coefficient µ is omitted.

Then, the brake ECU 70 proceeds to step 130 and determines whether an actual W/C pressure of the front outside wheel Pao is smaller than the target W/C pressure Pto. The actual W/C pressure of the front outside wheel Pao can be estimated based on a length of pressure boosting time in which the W/C pressure is boosted in the pressure boosting mode in order for the anti-lateral overturn control. The actual W/C pressure of the front outside wheel Pao can also be estimated based on a length of depressurization time in which the W/C pressure is decreased in the depressurization mode. Therefore, the estimated W/C pressure is used as the actual W/C pressure Pao and it is determined whether this estimate value is smaller than the target WIC pressure Pto. If the determination at step 130 is affirmative, the brake ECU 70 proceeds to step 135 to enter or remain in the pressure boosting mode and increase the W/C pressure of the front outside wheel. If the determination at step 130 is negative, the brake ECU 70 ends the anti-lateral overturn control process since the actual W/C pressure Pao has already reached the target W/C pressure Pto. Although it is not shown in the drawings, the brake ECU 70 may enter or remain in the depressurization mode and depressurize the W/C of the front outside wheel if the actual W/C pressure Pao of the front outside wheel is exceedingly larger than the target W/C pressure Pto.

On the other hand, if the determination at step 120 becomes affirmative, the brake ECU 70 proceeds to step 140 and subsequently step 145 to determine the target W/C pressure for a front inside wheel Pti as well as the target W/C pressure for the front outside wheel Pto. The front inside wheel is a front wheel at the side opposite to the front outside wheel. The target W/C pressure Pto is calculated by using the method used in step 125. The target W/C pressure Pti is determined so that it intentionally causes the front inside wheel to slip and makes the vehicle accordingly skid in order to cause understeer tendency and accordingly suppress lateral overturn. At this time, the target W/C pressure Pti may be set to a constant value. However, a W/C pressure necessary for causing the vehicle to skid varies depending on the state or like of the vehicle. Therefore, In the present embodiment, as is done for the target W/C pressure Pto, the brake ECU 70 determines the target W/C pressure Pti based on the loading weight LC detected at step 115. Since it becomes easier to cause the vehicle slip as the loading weight LC becomes larger, the target W/C pressure Pti is set so that it becomes smaller as the loading weight LC becomes larger as long as it can make the vehicle slip.

In addition, the target W/C pressure Pti can be determined based on the steering angle Sa, the roll angle of the vehicle, the states of the surface of the road beneath the vehicle as well as the loading weight LC. More specifically, the target W/C pressure Pti can be set so that it becomes smaller as the steering angle Sa and/or the roll angle becomes larger as long as it can make the vehicle slip. The target W/C pressure Pti can also be set so that it becomes smaller as the friction coefficient µ of the surface of the road becomes smaller as long as it can make the vehicle slip.

Figure 6:
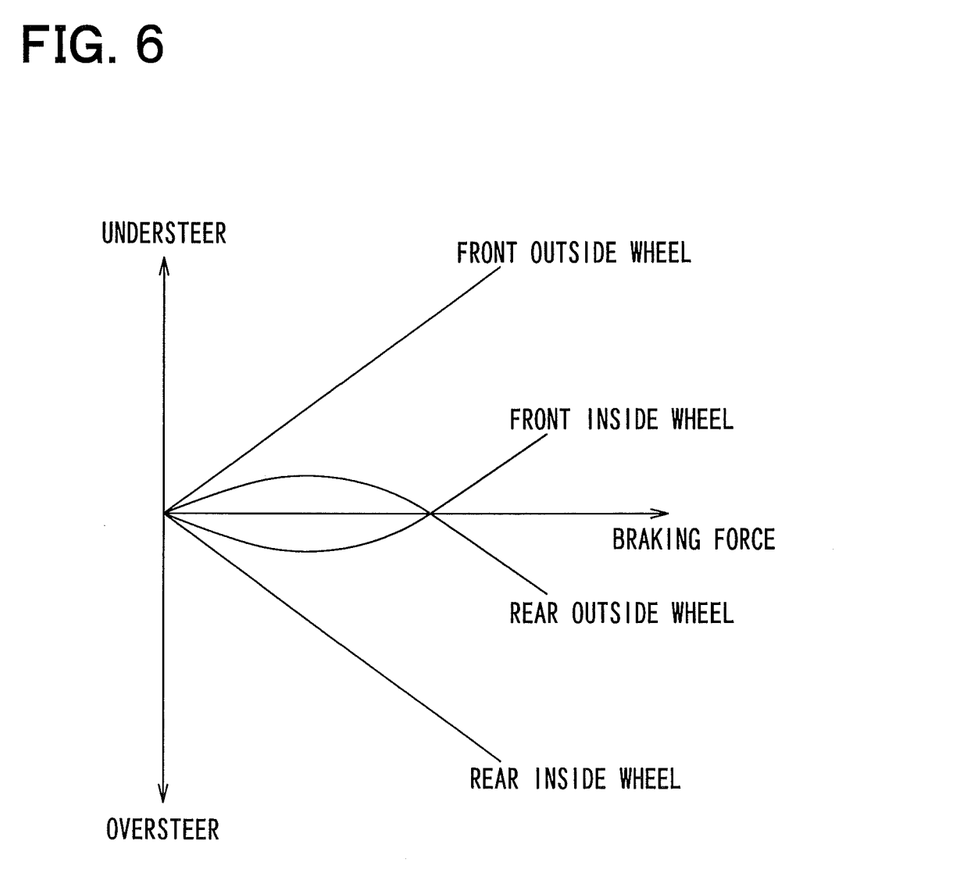
FIG. 6 is a characteristic graph showing relations between brake forces generated at wheels and state of the vehicle.

The target W/C pressures Pto and Pti are determined basically based on characteristic shown in FIG. 6. FIG. 6 is a characteristic graph showing relations between brake forces generated at wheels and state of the vehicle.

As shown in FIG. 6, the front outside wheel has a greater tendency to slipping than the other wheels. Therefore, the front outside wheel slides sideways and gets into the understeer state even with a small brake force. On the other hand, the front inside wheel does not slip and slide sideways until the brake force becomes fairly large. Therefore, as for the front outside wheel, the target W/C pressure Pto is set taking steering usability into account so that a brake force for suitable understeer is obtained. On the other hand, since the front inside wheel gets into oversteer state rather than the understeer state with a small brake force, the target W/C pressure Pti is set so that a brake force for generating understeer is obtained.

As described above, the characteristic shown in FIG. 6 changes when the loading weight LC, the steering angle Sa, the roll angle, and the friction coefficient µ of the surface of the road beneath the vehicle. For example, when the loading weight LC becomes larger than that of the empty vehicle, the entire characteristic lines in FIG. 6 moves to the left so as to decrease a brake force at which the front inside wheel switches from the oversteer state to the understeer state. Therefore, the target W/C pressures Pto and Pti can be determined based on the changes of the loading weight LC, the steering angle Sa, the roll angle, and the friction coefficient µ.

Then the brake ECU 70 proceeds to step 150 and determines whether an actual W/C pressure for the front inside wheel Pai is smaller than the target W/C pressure Pti. The actual W/C pressure Pai of the front inside wheel can be estimated based on the length of the pressure boosting time in which the W/C pressure is boosted in the pressure boosting mode in order for the anti-lateral overturn control and also based on the length of the depressurization time in which the W/C pressure is decreased in the depressurization mode. Therefore, the estimated W/C pressure is used as the actual W/C pressure Pai and it is determined whether this estimate value is smaller than the target W/C pressure Pti. If the determination at step 150 is affirmative, the brake ECU 70 proceeds to step 155 and increases the W/C pressure of the front inside wheel. If the determination at step 150 is negative, the brake ECU 70 proceeds to step 130 since the actual W/C pressure Pai has reached the target W/C pressure Pti. Although it is not shown in the drawings, the brake ECU 70 may enter or remain in the depressurization mode and depressurize the W/C of the front outside wheel if the actual W/C pressure Pai of the front outside wheel is exceedingly larger than the target W/C pressure Pti.

According to the above operation, when the actual W/C pressure Pai of the front inside wheel reaches the target W/C pressure Pti, the determination at step 150 becomes negative and the brake ECU 70 proceeds to step 130 and 135 to control the actual W/C pressure Pao so that it reaches the target W/C pressure Pto. Thus, the actual W/C pressure Pai of the front inside wheel becomes equal to the target W/C pressure Pti and the actual W/C pressure Pao of the front outside wheel becomes equal to the target W/C pressure Pto.

As described above, the brake ECU 70 performs the anti-lateral overturn control as a part of the vehicle motion control. In the anti-lateral overturn control, the brake ECU 70 determines the target W/C pressures Pto and Pti and increases the brake force in accordance with the target W/C pressures Pto and Pti so that the brake force can generate side slip of the front outside wheel and the front inside wheel. Therefore, the brake ECU 70 can cause the front inside wheel to skid as well as the front outside wheel. Since the brake ECU 70 actively causes the front inside wheel to skid as well as the front outside wheel, it is possible to further suppress rolling of the vehicle and, accordingly, the lateral overturn of the vehicle.

In addition, the brake ECU 70 sets the target W/C pressure Pti based on at least one of the loading weight LC (or otherwise, the total weight of the vehicle), the steering angle Sa, the roll angle, and the friction coefficient μ of the surface of the road beneath the vehicle, and accordingly changes the brake force generated at the front inside wheel. Therefore, it is possible to generate a brake force suitable for causing the front inside wheel to skid.

Moreover, the brake ECU 70 first increases the W/C pressure for the front inside wheel and, accordingly, the brake force at the front inside wheel and then secondly increases the W/C pressure for the front outside wheel and, accordingly, the brake force at the front outside wheel. Therefore, the brake ECU 70 gives the brake force to the front inside wheel early and thereby generates forward tilting (i.e. nose dive) at the front inside wheel side of the body of the vehicle. Accordingly, the front inside wheel is pressed to the surface of the road with larger pressing force (i.e. load) and comes to have a greater tendency to skidding. Consequently, the brake ECU 70 can cause the front inside wheel to skid with higher possibility and accordingly further suppress the lateral overturn of the vehicle.

In addition, in the present embodiment, the brake ECU 70 determines and uses the target W/C pressure Pti so as to cause the front inside wheel to skid only when the loading weight LC is larger than the threshold THI. The brake ECU 70 may cause the front inside wheel to skid even when the loading weight LC is smaller than the threshold THI. However, causing the front inside wheel to skid is fundamentally identical with putting the vehicle into the understeer state which harms steerability. Therefore, it is preferable that brake ECU 70 determines and uses the target W/C pressure Pti only when the lateral overturn of the vehicle is highly possible. Thus, the brake ECU 70 can prevent the vehicle from needlessly getting into the understeer state and also suppress reduction of the steering usability.

Second Embodiment

Hereinafter, a second embodiment of the present invention is described. In the present embodiment, a part of the anti-lateral overturn control is different from that in the first embodiment, but other features are the same as the first embodiment. Accordingly, only the different points will be described.

The brake control system 1 in the present embodiment performs the same anti-lateral overturn control as that in the first embodiment, except for that an operation for the front inside wheel in the anti-lateral overturn control in the present embodiment is different from that in the first embodiment.

Figure 7:
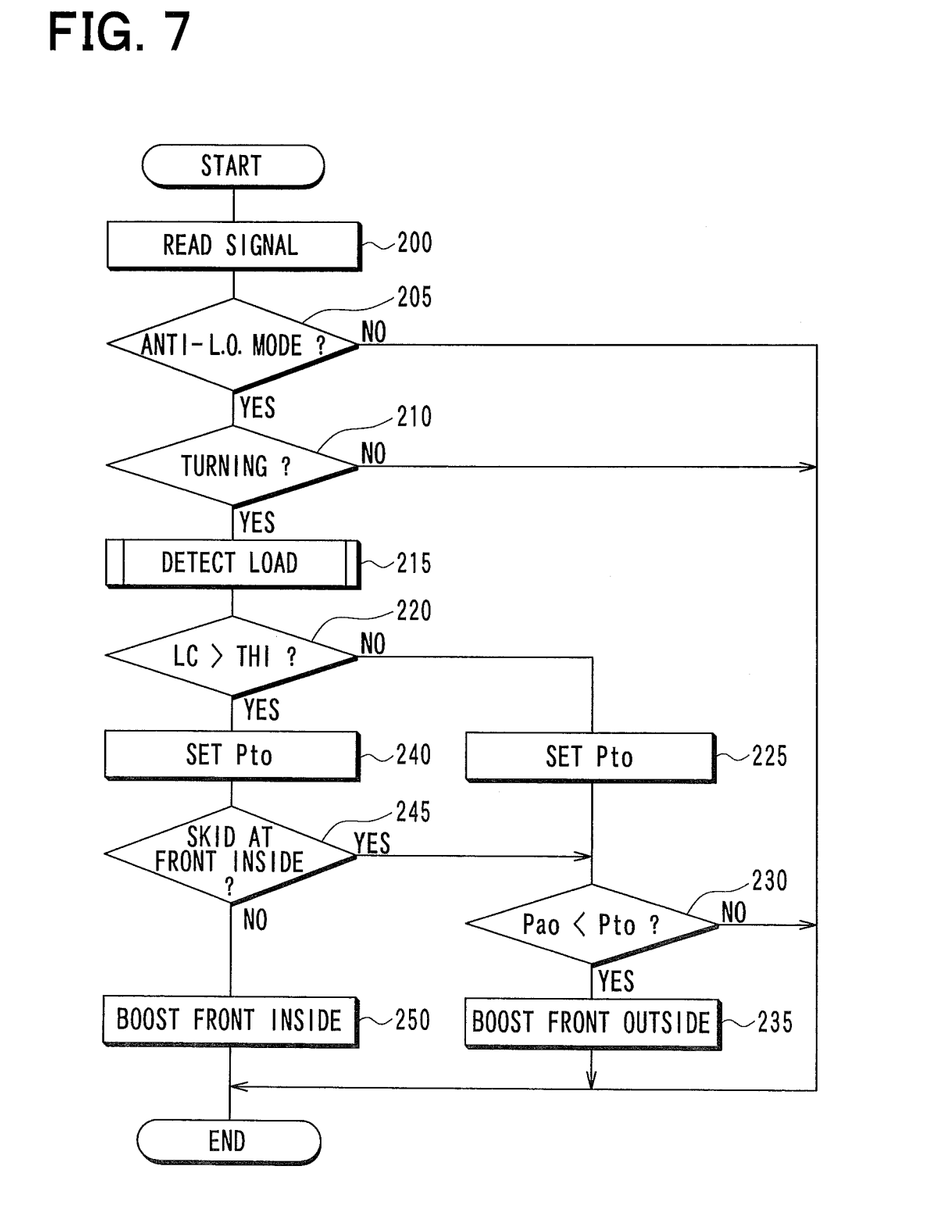
FIG. 7 is a flowchart showing an anti-lateral overturn control according to a second embodiment of the present invention.

FIG. 7 is a flowchart showing the anti-lateral overturn control performed by the brake ECU 70 in the present embodiment.

As shown in this drawing, operations in steps 200 to 240 are basically the same as the operations in steps 100 to 140 in FIG. 3 described in the first embodiment. The operations in steps 145 to 155 in FIG. 3 are replaced by operations in steps 245 and 250.

More specifically, after setting the target W/C pressure Pto for the front outside wheel at step 240, the brake ECU 70 omits setting the W/C pressure Pti for the front inside wheel and determines at step 245 whether the front inside wheel is skidding. The brake ECU 70 determines that the front inside wheel is skidding when the actual slip ratio of the front inside wheel is larger than a predetermined threshold, wherein the actual slip ratio of the front inside wheel is one of the actual slip ratios of the wheels calculated at step 200 corresponding to the front inside wheel. When the front inside wheel is not skidding, the brake ECU 70 proceeds to step 250 and increases the pressure of the W/C for the front inside wheel.

In other words, the brake ECU 70 increases the W/C pressure for the front inside wheel until the front inside wheel starts skidding, and starts increasing the W/C pressure of the front outside wheel when the front inside wheel starts skidding. This operation can cause the front inside wheel to skid with higher possibility than the operation in which the target W/C pressure Pti is set for the front inside wheel. Thus, the present embodiment can obtain benefit similar to that of the first embodiment.

Third Embodiment

Hereinafter, a third embodiment of the present invention is described. In the present embodiment, timings of increasing the W/C pressures for the front inside wheel and front outside wheel are different from that in the first embodiment, but other features are the same as the first embodiment. Accordingly, only the different points will be described.

Figure 8:
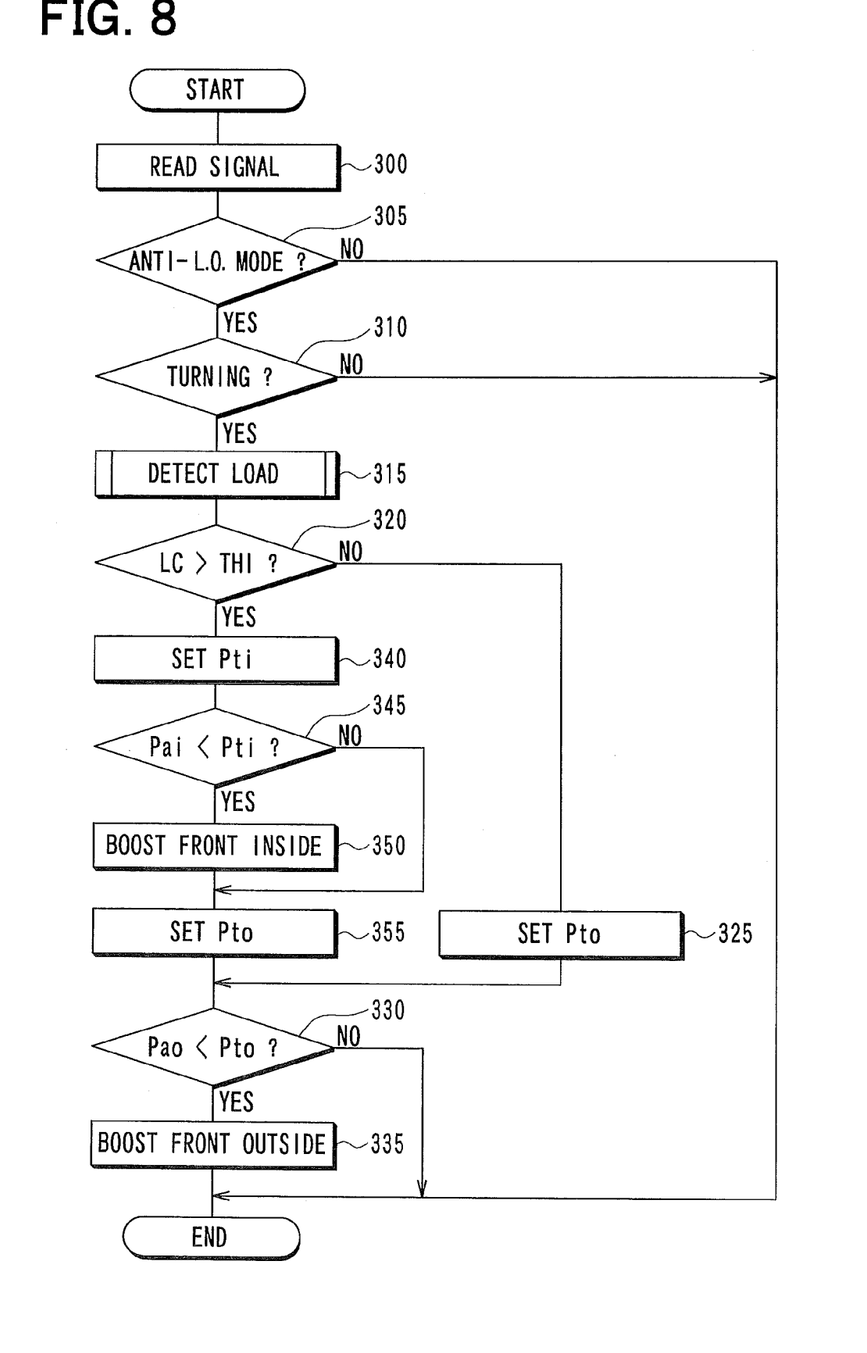
FIG. 8 is a flowchart showing an anti-lateral overturn control according to a third embodiment of the present invention.

FIG. 8 is a flowchart showing the anti-lateral overturn control performed by the brake ECU 70 in the present embodiment.

As shown in this drawing, operations in steps 300 to 335 are basically the same as the operations in steps 100 to 135 in FIG. 3 described in the first embodiment. The operations in steps 140 to 155 in FIG. 3 are replaced by operations in steps 340 and 355.

More specifically, the brake ECU 70 determines at step 340 the target W/C pressure Pti for the front inside wheel. The target W/C pressure Pti is calculated in the same way as step 145 in FIG. 3. Subsequently, the brake ECU 70 proceeds to step 345 and determines whether the actual W/C pressure Pai for the front inside wheel is smaller than the target W/C pressure Pti. If the determination at step 345 is affirmative, the brake ECU 70 proceeds to step 350 to increase the W/C pressure for the front inside wheel and then proceeds to step 355. If the determination at step 345 is negative, the brake ECU 70 proceeds directly to step 355. At step 355, the brake ECU 70 determines the target W/C pressure Pto for the front outside wheel and then executes the processes at step 330 and 335.

Thus, the brake ECU 70 in the present embodiment increases the W/C pressure of the front outside wheel even if the actual W/C pressure Pai for the front inside wheel is smaller than the target W/C pressure Pti. Therefore, the brake ECU 70 operates so that the brake force is generated at the front inside wheel and front outside wheel at the same time.

The present embodiment can obtain benefit similar to that of the first embodiment. In addition, the operation in the present embodiment differs from the first embodiment in that the brake ECU 70 in the first embodiment first generates the brake force at the front inside wheel and, after that, generates the brake force at the front outside wheel. Therefore, while the brake ECU 70 in the first embodiment has the advantageous effect in which the brake ECU 70 gives the brake force to the front inside wheel early and thereby generates forward tilting (i.e. nose dive) at the front inside wheel side of the body of the vehicle, the present embodiment has, on the other hand, a different advantageous effect as described below.

Since the brake ECU 70 in the present embodiment can cause the brake forces at the front inside wheel and the front outside wheel at the same time, the brake ECU 70 can generate forward tilting (i.e. nose dive) at both of the front inside wheel side and the front outside wheel side of the body of the vehicle at the same time. Generating the forward tilting only at the front inside wheel side of the vehicle body and making the front inside wheel skid preferentially may cause the vehicle to roll and vibrate. Therefore, the brake ECU 70 in the present embodiment can suppress the rolling and vibration of the vehicle. In addition, since the brake ECU 70 in the present embodiment can also cause skidding at the front inside wheel early and with higher possibility, it can further suppress the lateral overturn of the vehicle, as is the case with the first embodiment.

Other Embodiments (1) In the above embodiments, the lateral acceleration Gy is used as an example of a physical quantity representing a state of the motion of the vehicle in the direction of the lateral overturn. However, another quantity can be used as the physical quantity representing a state (or amount) of the motion of the vehicle in the direction of the lateral overturn. For example, the brake ECU 70 may detect the roll angle of the vehicle directly by means of the roll angle sensor and use the detected roll angle as the physical quantity representing a state of the motion of the vehicle in the direction of the lateral overturn. In addition, the brake ECU 70 may detect a degree of a tendency for the lateral overturn of the vehicle based on the steering angle Sa and either one of the yaw rate Yr and the lateral acceleration Gy. For example, the degree of the tendency for the lateral overturn of the vehicle can be represented by a difference between a target yaw rate and an actual yaw rate detected by the yaw rate sensor 76, wherein the target yaw rate can be estimated based on the steering angle Sa and the lateral acceleration by using a well-known method.

(2) In the first to third embodiments, the brake ECU 70 increases the W/C pressure for the front inside wheel only when at least two conditions are satisfied, wherein one of the two conditions is that the brake ECU 70 is in the anti-lateral overturn mode and the other of the two conditions is that the vehicle is turning. However, the brake ECU 70 may make a prognosis in advance that these two conditions are going to be satisfied and accordingly increase the W/C pressure for the front inside wheel in advance and maintain the increased W/C pressure until the vehicle stars skidding. For example, the brake ECU 70 may make a prognosis in advance that these two conditions are going to be satisfied when the vehicle is turning and the lateral acceleration Ga becomes larger than a threshold which is smaller than the threshold THg used to determine whether the brake ECU 70 is in 0.15 the anti-lateral overturn mode. In this case, the target W/C pressure Pti may be set to a value which can generate at the front inside wheel a marginal brake force (see FIG. 6). The marginal brake force is determined so that the front inside wheel switch from the oversteer state to the understeer state and accordingly skids when the brake force at the front inside wheel becomes larger than the marginal brake force.

With this operation, as soon as the above two conditions become satisfied and the brake ECU 70 accordingly increases the W/C pressure of the front inside wheel in order to increase the brake force at the front inside wheel, the brake ECU 70 can cause the front inside wheel to skid. Therefore, it is possible to cause the front inside wheel to start skidding earlier and thereby further suppress the lateral overturn of the vehicle.

In addition, when the brake ECU 70 makes a prognosis in advance that above two conditions are going to be satisfied, the brake ECU 70 may determine the target W/C pressure for the front inside wheel which can generate at the front inside wheel a marginal brake force so that target W/C pressure changes depending on at least one of the loading weight LC (or otherwise, the total weight of the vehicle), the steering angle Sa, the roll angle, and the friction coefficient μ of the surface of the road. With this operation, it is possible to generate a brake force at the front inside wheel so that the brake force is suitable for causing the front inside wheel to skid.

(3) Although the brake force is generated at the front outside wheel in order to perform the anti-lateral overturn control in the above embodiments, a wheel (or wheels) at which a brake force is generated in order to perform the anti-lateral overturn control may any one (or more) of outside wheels of the vehicle. The outside wheels are the wheels at the counter side of the turning direction of the vehicle. Therefore, a wheel (or wheels) at which a brake force is generated in order to perform the anti-lateral overturn control may be the rear outside wheel or both of the front outside wheel and the rear outside wheel.

(4) In the above embodiments, the anti-lateral overturn control is described in an exemplary situation in which the anti-lateral overturn control is performed while the driver is not pressing the brake pedal 1 and the brake force is not hence generated. However, there is a case in which the anti-lateral overturn control is performed while the brake force is being generated. In such a case, the anti-lateral overturn control is performed in a manner that the brake ECU 70 further increases the brake forces which has already been generated before starting the anti-lateral overturn control at the front outside wheel and the front inside wheel.

(5) Each of the steps shown in the drawings corresponds to a means for executing a process in the step. For example, in FIGS. 3, 7 and 8, each of steps 105, 205, 305 corresponds to a mode setting means, each of steps 110, 210, 310 corresponds to a turning state determination means, steps 135 and 155 correspond to a brake force control means, steps 235 and 250 correspond to a brake force control means, steps 335 and 350 correspond to a brake force control means, step 245 corresponds to a skid determination means, and each of steps 120, 220, 320 corresponds to a loading weight determination means.

What is claimed is:

1. A vehicle motion control device, comprising:
a mode setting means for obtaining a physical quantity representing a state of motion of a vehicle in a direction of lateral overturn and for being in an anti-lateral overturn mode when the obtained physical quantity is larger than or equal to a motion state threshold, the anti-lateral overturn mode being for suppressing the lateral overturn of the vehicle;
a turning state determination means for determining whether the vehicle is turning;
a brake force control means for increasing a brake force to be generated at an outside wheel of the vehicle when a condition is satisfied that the vehicle is in the anti-lateral overturn mode and the turning state determination means determines that the vehicle is turning; and
a loading weight determination means for detecting a loading weight based on at least one of a first relation or a second relation and determining whether the loading weight is larger than a predetermined threshold, wherein the first relation is a relation between a steering speed of the vehicle and a phase difference between a steering angle and a yaw rate of the vehicle, and the second relation is a relation between a yaw angular acceleration and a phase difference between the yaw rate and a lateral acceleration of the vehicle, wherein
the brake force control means performs anti-lateral overturn control for increasing a brake force to be generated at a front inside wheel of the vehicle in order to cause skidding at the front inside wheel when the condition for increasing the brake force to be generated at the outside wheel is satisfied, wherein the condition is that the vehicle motion control device is in the anti-lateral overturn mode and the turning state determination means determines that the vehicle is turning, and
the brake force control means increases the brake force for the front inside wheel only when the loading weight determination means determines that the loading weight is larger than the predetermined threshold.

2. The vehicle motion control device according to claim 1, further comprising a skid determination means for determining whether the front inside wheel is skidding, wherein
the brake force control means increases, in order to cause the front inside wheel to skid, the brake force for the front inside wheel until the skid determination means determines that the front inside wheel is skidding.

3. The vehicle motion control device according to claim 1, wherein the brake force control means increases the brake force to be generated at the outside wheel and the brake force to be generated at the front inside wheel at the same time when the condition for increasing the brake force to be generated at the outside wheel is satisfied.

4. The vehicle motion control device according to claim 1, wherein the brake force control means increases, when the condition for increasing the brake force to be generated at the outside wheel is satisfied, the brake force to be generated at the front inside wheel and subsequently increases, after the front inside wheel starts skidding, the brake force to be generated at the outside wheel.

5. The vehicle motion control device according to claim 1, further comprising a prognosis means for making a prognosis in advance that the condition for increasing the brake force to be generated at the outside wheel is going to be satisfied, wherein
the brake force control means increases, when the condition for increasing the brake force to be generated at the outside wheel is satisfied, the brake force for the front inside wheel to a marginal brake force above which the front inside wheel skids.

* * * * *